United States Patent Office 3,075,992
Patented Jan. 29, 1963

3,075,992
ESTERS OF INDOLES
Albert Hofmann and Franz Troxler, Bottmingen, Basel-Land, Switzerland, assignors to Sandoz Ltd., Basel, Switzerland, a Swiss firm
No Drawing. Filed Mar. 28, 1961, Ser. No. 98,740
Claims priority, application Switzerland Sept. 12, 1958
11 Claims. (Cl. 260—319)

This application is a continuation-in-part of copending application Serial No. 19,204, filed April 1, 1960, which is in turn a continuation-in-part of our earlier application Serial No. 838,037, filed September 4, 1959, and now abandoned.

The present invention relates to new esters of the indole series. More particularly, the invention is especially concerned with therapeutically valuable esters of the formula

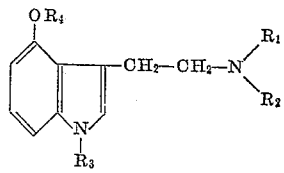

(I)

wherein each of $R_1$ and $R_2$ is a lower alkyl group (e.g. methyl, ethyl, propyl, isopropyl, butyl, isobutyl, etc.), the two groups being identical or different, or $R_1$ and $R_2$ together with the adjacent nitrogen atom form a pyrrolidine or piperidine ring, $R_3$ stands for a hydrogen atom or a lower alkyl group (e.g. methyl, ethyl, propyl, isopropyl, butyl, isobutyl, etc.) or a lower alkenyl group (e.g. allyl, butenyl, etc.) or a lower aralkyl group (e.g. benzyl, phenylethyl, phenylpropyl, benzhydryl, etc.), and $R_4$ stands for a residue of a tribasic oxygen-containing inorganic acid (e.g. phosphoric acid, etc.) or of an organic carboxylic acid (e.g. acetic acid, benzoic acid, trimethylacetic acid, etc.).

The new compounds (I) of the present invention comprise, as particular or preferred sub-groups, the following esters:

(a) The phosphoryloxy-indoles of the formula

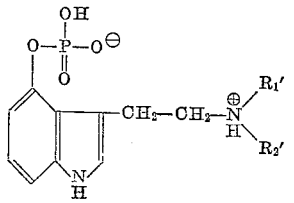

(II)

wherein $R_1'$ and $R_2'$ represent alkyl groups containing from 2 to 4 carbon atoms (e.g. ethyl, propyl, isopropyl, butyl, isobutyl, etc.) or $R_1$ and $R_2$ together represent a tetra- or pentamethylene chain, (b) The corresponding, 1-position-substituted phosphoryloxy-indoles of the formula

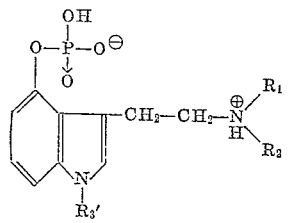

(III)

wherein $R_1$ and $R_2$ have the previously-recited significances, and $R_3'$ stands for a lower alkyl group (e.g. methyl, ethyl, propyl, isopropyl, butyl, isobutyl, etc.) or a lower alkenyl group (e.g. allyl, butenyl, etc.) or a lower aralkyl group (e.g. benzyl, phenylethyl, phenylpropyl, benzhydryl, etc.), (c) The acyloxy-indoles of the formula

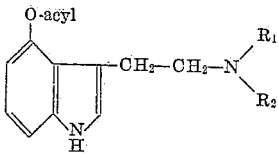

(IV)

wherein $R_1$ and $R_2$ have the previously-recited significances and acyl stands for a residue of an organic carboxylic acid containing from 1 to 10 carbon atoms (e.g. acetyl, benzoyl, trimethylacetyl, etc.), (d) The corresponding, 1-position-substituted acyloxy-indoles of the formula

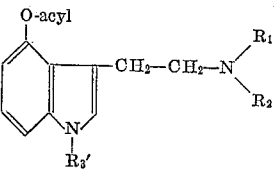

(V)

wherein $R_1$, $R_2$, $R_3'$ and acyl have the above-recited significances.

The new esters of Formula I are prepared by esterifying a corresponding hydroxy-indole

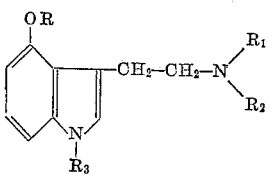

(VI)

wherein $R_1$, $R_2$ and $R_3$ have the precedingly-recited significances, preferably in the form of its salt with an inorganic base and in an inert organic solvent, by treatment with an appropriate reactive derivative of a tribasic oxygen-containing acid or of an organic carboxylic acid.

More specifically, the process may be carried out as follows:

A hydroxy-indole of Formula VI is first dissolved either in water containing one mole of a base, or in the form of a salt with an inorganic base in an inert solvent, following which an appropriate acid derivative is added to the solution. Suitable acid derivatives for the preparation of acyloxy-indole compounds (IV, V) comprise advantageously acid halides, more especially acid chlorides such as e.g. acetyl chloride, benzoyl chloride, etc.; acetic anhydride may also be employed with advantage for acetylation. For example, 3-(2'-dimethylaminoethyl)-4-hydroxy-indole in the form of an alkali metal salt thereof is reacted with benzoyl chloride in an inert solvent such as toluene, 1,2-dimethoxy-ethane, tertiary amyl alcohol, etc., the reaction mixture shaken for several hours at room temperature (about 20° to about 30° C.) and then distributed between water and a water-immiscible organic solvent. The organic phase is separated and dried and the solvent evaporated. The residual crude product can be crystallized directly from a suitable solvent or solvent mixture, such e.g. as chloroform or ethyl acetate-petroleum ether, etc. If necessary, preliminary purification can be effected by filtration through a column of aluminum oxide.

Where phosphoryloxy-indole compounds (II, III) are being prepared, the acid derivative is, of course, a phosphoric acid derivative. Thus, the hydroxy-indole of Formula VI, e.g. in the form of an alkali metal salt thereof, is reacted with e.g. one mole of phosphoric acid-dibenzylester chloride or pyrophosphoric acid-tetrabenzylester or phosphoric acid-diphenylester chloride in an inert solvent such as toluene, 1,2-dimethoxy-ethane, tertiary amyl alcohol, etc., after which the reaction solution is shaken or allowed to stand at room temperature (about 20° to about 30°) for several hours, if desired in a nitrogen atmosphere. The solution is thereupon evaporated to dryness, the residue taken up in an organic solvent such as alcohol or an alcohol-chloroform mixture, insolubles filtered off, after which the formed phosphoric acid-dibenzylester or -diphenylester of the initial 4-hydroxy-indole can be caused to crystallize directly. In cases where no crystallization occurs, filtration through a column of aluminum oxide is the preferred method of purification. The benzyl or phenyl groups of the obtained phosphoric acid-dibenzylester or -diphenylester, respectively, of the 4-hydroxy-indole are then split off by shaking in methanol solution with palladium catalyst and hydrogen, whereupon the resultant phosphoric acid ester is caused to crystallize out from a solvent, preferably methanol or water, after removal of the catalyst.

The 1-position-unsubstituted hydroxy-indoles of Formula VI, i.e. a first subgroup of starting compounds having the formula

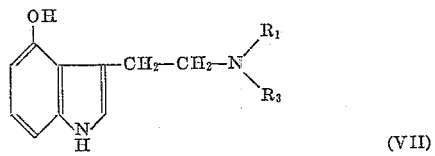

wherein $R_1$ and $R_2$ are as precedingly defined, can be prepared for example by condensing a substituted indole of the formula

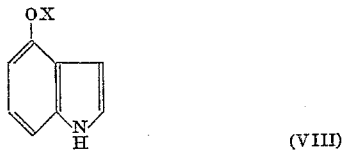

wherein X is a protective group, e.g. a benzyl group or another group which is capable of being easily split off, first with a dihalide of oxalic acid, e.g. oxalyl chloride, and then with a secondary amine of the formula

wherein $R_1$ and $R_2$ are as precedingly defined e.g. dimethylamine, piperidine, etc. The resulting condensation product is reduced e.g. with lithium aluminum hydride in absolute dioxane, after which the protective group X is split off from the obtained indole of the formula

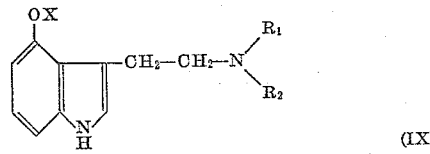

for example by hydrolysis with hydrobromic acid in glacial acetic acid or preferably by hydrogenation over a palladium catalyst.

The hydroxy-indoles of Formula VI which are substituted in the 1-position, i.e. a second subgroup of starting compounds having the formula

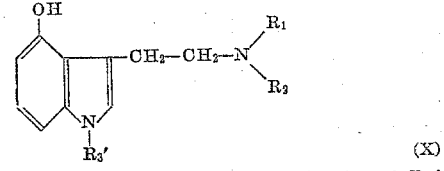

wherein $R_1$ and $R_2$ are as precedingly defined and $R_3'$ stands for a lower alkyl or a lower alkenyl or a lower aralkyl group, can be prepared for example from the above said indoles of Formula IX by alkylation or alkenylation or aralkylation according to per se known methods. The benzyl radical, which it is preferred to use as protective group, is then split off e.g. by catalytic hydrogenation.

The new compounds of the present invention are solid and generally well crystallized substances at room temperature. They all give a positive color reaction—the shade of which varies in accordance with substituents present —with Keller's reagent (glacial acetic acid containing ferric chloride and concentrated sulfuric acid). The color reaction according to Van Urk (p-dimethyl-aminobenzaldehyde and dilute mineral acid) with the compounds (I) above may be positive or negative, depending upon the nature of the ester group and the other substituents.

The said compounds are characterized by interesting pharmacodynamic properties as evidenced by the results of animal tests. In particular, they stimulate the central sympathetic nervous system, which stimulation is manifested in the form of mydriasis, increase in blood pressure and body temperature, increase in blood sugar, as well as by an inhibition of intestinal motility; they furthermore stimulate the spinal reflexes. The said esters also exhibit distinct serotonin-antagonistic properties; in this respect especially indole-esters, which are substituted in the 1-position—such as for example 1-methyl- and 1-benzyl-3-(2'-dimethylaminoethyl)-4-phosphoryloxy-indole, 1-methyl-3-(2'-dimethylaminoethyl)-4-benzoyloxy-indole etc.—show a very strong action. At the same time, the esters (I) above exert a mild sedative and tranquilizing action, while having a very low toxicity.

The central vegetative and tranquilizing properties of the compounds (I) above are useful in the treatment of various diseases, in which the psychic functions are effected and the pronounced serotonin-antagonistic properties are useful in the treament of allergic diseases.

The compounds (I) are practically quantitatively resorbed by the animal organism and are therefore preferably administered perorally, but can equally well be administered subcutaneously, intramuscularly or intravenously. While they are thus intended for therapeutic purposes, they are also valuable intermediates for the preparation of other medicaments.

The following examples illustrate the invention but are not limitative thereof in any way. Parts and percentages are by weight, unless otherwise indicated; the relationship between parts by weight and parts by volume is the same as that between grams and milliliters. Temperatures are in degrees centigrade; melting points are uncorrected.

EXAMPLE 1

*3-(2'-dimethylaminoethyl)-4-benzoyloxy-indole*

0.408 part of 3-(2'-dimethylaminoethyl)-4-hydroxy-indole and 2 parts by volume of 1-normal aqueous caustic soda solution are evaporated to dryness, the dry residue dissolved in 15 parts by volume of 1,2-dimethoxy-ethane, after which a solution of 0.267 part of benzoyl chloride in 5 parts by volume of 1,2-dimethoxy-ethane is added. The mixture is shaken for two hours and then distributed between water and chloroform. The chloroform phase is separated and dried over potassium carbonate, then evaporated to dryness and the residue crystallized from ethyl acetate-petroleum ether, whereupon 3-(2'-dimethylaminoethyl) - 4-benzoyloxy - indole is obtained as hexagonal plates which melt at 109–111°.

Keller's color reaction: brownish violet.

The 3-(2'-dimethylaminoethyl) - 4-hydroxy - indole is prepared as follows:

12 parts of 4-benzyloxy-indole are dissolved in 300 parts of ether and 9.6 parts of oxalyl chloride are stirred dropwise into the solution at 0–3°. 30 minutes later, 20 parts of anhydrous dimethylamine are slowly added while stirring and cooling with ice; the mixture is then stirred for a few minutes at room temperature and filtered. The precipitate is washed thoroughly with water and the water-insoluble portion is dried in a high vacuum. The dimethylamide of [4-benzyloxy-indolyl-(3)]- glyoxylic acid is thus obtained as a yellow crystalline powder which melts at 148–150° after crystallization from benzene-methanol-petroleum ether. A solution of 4 parts of the latter in 80 parts by volume of absolute dioxane is stirred dropwise into a solution of 5 parts of lithium aluminum hydride in 100 parts by volume of absolute dioxane. The mixture is refluxed for 24 hours. The complex which has been formed and excess of reducing agent are then decomposed by treatment with methanol and a saturated solution of sodium sulfate, the mixture filtered and the filtrate shaken out with a solution of tartaric acid and ether. The ether solution is discarded, while the tartaric acid extract is made alkaline to phenolphthalein by addition of concentrated caustic soda solution. The crude base, which thereby separates out as an oily substance, solidifies slowly. The so-obtained 3-(2'-dimethylamioethyl)-4-benzyloxy-indole is dissolved in benzene and the benzene solution filtered through a column of aluminum oxide. The so-obtained colorless oil —3-(2'-dimethylaminoethyl)-4-benzyloxy-indole—crystallizes from ether-petroleum ether as prisms which melt at 119–121°.

A solution of 4 parts of 3-(2'-dimethylaminoethyl)-4-benzyloxy-indole in 100 parts by volume of methanol is shaken with 2 parts of palladium catalyst on aluminum oxide and hydrogen. When the hydrogen uptake has finished, the solution is filtered and the solvent evaporated to dryness. The residue is sublimated in a high vacuum at a temperature of 130°, whereby snow-white 3 - (2' - dimethylaminoethyl) - 4 - hydroxy - indole of M.P. 173–176° is obtained.

Keller's color reaction: blue.

EXAMPLE 2

1-Methyl-3-(2'-Dimethylaminoethyl)-4-Phosphoryloxy-Indole 0.910 part of 1-methyl-3-(2'-dimethylaminoethyl)-4-hydroxy-indole is evaporated to dryness with 4.35 parts by volume of 0.96-normal aqueous caustic solution, drying being continued for two hours at 70° under a high vacuum. The dry residue is dissolved in 30 parts by volume of 1,2-dimethoxy-ethane, after which there is added a carbon tetrachloride solution of phosphoric acid-dibenzylester-chloride, prepared from 1.13 parts of dibenzyl phosphite. The mixture is shaken for 15 hours at room temperature, precipitated sodium chloride is filtered off, the filtrate evaporated to dryness, and the residue chromatographed on the 30-fold quantity of aluminum oxide, the formed 1-methyl-3-(2'-dimethylaminoethyl)-4-dibenzylphosphoryloxy-indole being washed into the filtrate with chloroform+10% ethanol.

A solution of 1 part of the thus obtained compound in 50 parts by volume of methanol is shaken with 0.8 part of palladium catalyst on aluminum oxide—while introducing hydrogen—until hydrogen uptake ceases. The catalyst is then filtered off, washed thoroughly with methanol, and the filtrate evaporated under reduced pressure, the obtained 1-methyl-3-(2'-dimethylaminoethyl)-4-phosphoryloxy-indole crystallizing out as a colorless substance having a melting point of 242–244°.

Keller's color reaction: blue-green, makes its first appearance several seconds after mixing the reagents, full intensity after several minutes.

Van Urk's color reaction: negative.

The 1 - methyl - 3 - (2' - dimethylaminoethyl) - 4 - hydroxy-indole, used as starting material, can be prepared as follows:

3 - (2' - dimethylaminoethyl) - 4 - benzyloxy - indole, together with metallic potassium, is stirred in liquid ammonia for 30 minutes at −60°. Methyl iodide is added, the ammonia evaporated after 15 to 30 minutes, the residue distributed between water and chloroform, the chloroform extract evaporated and the residual crude product chromatographed on aluminum oxide. The obtained 1 - methyl - 3 - (2' - dimethylaminoethyl) - 4 - benzyloxy-indole crystallizes from ether-petroleum ether in the form of rodlets which melt at 62–67°. The compound is shaken in methanol solution with hydrogen and palladium catalyst on aluminum oxide until the uptake of hydrogen ceases, whereupon the catalyst and solvent are removed. The so-obtained 1-methyl-3-(2'-dimethylaminoethyl) - 4 - hydroxy - indole crystallizes from methanol-ether as irregular plates which melt at 125–127°.

Keller's color reaction: gray.

Van Urk's color reaction: green.

The 3 - (2' - dimethylaminoethyl) - 4 - benzyloxy-indole can be prepared as described in Example 1.

EXAMPLE 3

1-Benzyl-3-(2'-Dimethylaminoethyl)-4-Phosphoryloxy-Indole 5.433 parts of 1-benzyl-3-(2'-dimethylaminoethyl)-4-hydroxy-indole are stirred at room temperature and in a nitrogen atmosphere into a solution of 0.478 part of sodium in 60 parts by volume of tertiary amyl alcohol, after which the mixture is warmed to 50° for 15 minutes, followed by stirring for another 2½ hours at room temperature. A carbon tetrachloride solution of phosphoric acid-dibenzylester-chloride, prepared from 5.65 parts of dibenzyl-phosphite, is then added. Stirring is continued for 3½ more hours at room temperature, after which the mixture is allowed to stand overnight, and then precipitated sodium chloride is filtered off. The filtrate is evaporated to dryness and the residue chromatographed on the 30-fold quantity of aluminum oxide, the formed 1 - benzyl - 3 - (2' - dimethylaminoethyl)-4-dibenzylphosphoryloxy-indole is washed into the filtrate with a mixture of chloroform+10 to 15% methanol.

A solution of 3.47 parts of the above compound in 50 parts by volume of methanol is shaken with hydrogen and 2.6 parts of palladium catalyst on aluminum oxide until hydrogen absorption ceases. The catalyst is then filtered off, washed thoroughly with methanol, and the filtrate evaporated under reduced pressure until crystallization begins. The so-obtained 1-benzyl-3-(2'-dimethylaminoethyl) - 4 - phosphoryloxy - indole crystallizes from methanol in the form of plates which melt at 235–237°.

Keller's reaction: negative.

Van Urk's reaction: negative.

The 1-benzyl-3-(2'-dimethylaminoethyl) - 4 - hydroxyindole is prepared from 3-(2'-dimethylaminoethyl)-4-benzyloxy-indole in the manner described for 1-methyl-3-(2'-dimethylaminoethyl)-4-hydroxy-indole in Example 2, with the exception that the methyl iodide there employed is replaced by benzyl bromide. 1-benzyl-3-(2'-dimethylaminoethyl)-4-benzyloxy-indole crystallizes from benzene-petroleum ether as needles which melt at 87–88°. 1-benzyl-3-(2'-dimethylaminoethyl)-4-hydroxy - indole crystallizes from benzene in the form of aggregates of compact prisms which melt at 112–118°.

Keller's color reaction: olive-green.

Van Urk's color reaction: weak greenish blue.

EXAMPLE 4

3-(2'-Dimethylaminoethyl)-4-Acetoxy-Indole 0.408 part of 3-(2'-dimethylaminoethyl)-4-hydroxyindole in the form of the sodium salt is reacted with acetyl chloride in 1,2-dimethoxy-ethane solution, after the manner described in Example 1, and the reaction mixture is allowed to stand for two hours and then worked up after the manner described in Example 1. After crystallization from ether-petroleum ether, the obtained 3-(2'-dimethylaminoethyl)-4-acetoxy-indole melts at 92–95°.

Keller's color reaction: green, becomes violet.

EXAMPLE 5

3-(2'-Dimethylaminoethyl)-4-Trimethylacetoxy-Indole 0.345 part of sodium is dissolved in 30 parts by volume of ethanol, 2.81 parts of 3-(2'-dimethylaminoethyl)-4-hydroxy-indole are added in a nitrogen atmosphere, and the mixture then evaporated to dryness. 40 parts by volume of 1,2-dimethoxy-ethane are then added to the dry residue, followed by a solution of 1.69 parts of trimethyl-acetyl chloride (pivalic acid chloride) in 20 parts by volume of 1,2-dimethoxy-ethane, after which the mixture is stirred for three hours at room temperature. The reaction mixture is filtered through talc, the filtrate evaporated to dryness, and the residue chromatographed on a column of aluminum oxide with chloroform. The so-obtained 3-(2'-dimethylaminoethyl)-4-trimethyl-acetoxy-indole crystallizes from benzene-petroleum ether in the form of small shuttle- and druse-shaped crystals which melt at 123–124°.

Keller's color reaction: green.
Van Urk's color reaction: light blue.

EXAMPLE 6

3-(2'-Dimethylaminoethyl)-4-Phosphoryloxy-Indole 0.408 part of 3-(2'-dimethylaminoethyl)-4-hydroxy-indole is converted into the sodium salt by treatment with the calculated amount of sodium methylate. The methanol is evaporated, the residue dissolved in 15 parts by volume of 1,2-dimethoxy-ethane and the solution shaken for 1 hour with an equimolar quantity of dibenzyl-phosphoryl chloride in an atmosphere of nitrogen. The resulting mixture is evaporated to dryness, the residue dissolved in absolute chloroform and the solution filtered to remove insoluble material. The chloroform solution is chromatographed through a column of aluminum oxide. The resulting 3-(2'-dimethylaminoethyl)4-dibenzylphosphoryloxy-indole is washed out from the column with chloroform+5–10% alcohol; the product forms a white foam which fails to crystallize.

0.350 part of the above compound is hydrogenated in 8 parts by volume of methanol in the presence of palladium catalyst. When the hydrogen absorption has ceased, the solution is filtered free of the catalyst and the filtrate concentrated carefully. The resulting 3-(2'-dimethylaminoethyl)-4-phosphoryloxy-indole crystallizes out as small, massive, colorless prisms of M.P. 210–212° (decomposition).

Keller's color reaction: blue.

EXAMPLE 7

3-(2'-Diethylaminoethyl)-4-Phosphoryloxy-Indole 1.19 parts of 3-(2'-diethylaminoethyl)-4-hydroxy-indole is converted into the sodium salt by treatment with the caculated amount of methanolic caustic soda solution. The resulting sodium salt is dried in a high vacuum at a temperature of 60° and then dissolved in 20 parts by volume of 1,2-dimethoxy-ethane. To this solution there are added 1.53 parts of dibenzyl-phosphoryl chloride dissolved in carbon tetrachloride and the mixture is shaken at room temperature for 18 hours. The mixture is evaporated to dryness and the residue chromatographed on a column of 60 parts of aluminum oxide. The resulting 3 - (2' - diethylaminoethyl) - 4 - dibenzylphosphoryloxy-indole is eluted from the column with chloroform+10–20% ethanol.

1.4 parts of the so-obtained compound are hydrogenated in 50 parts by volume of methanol in the presence of palladium catalyst. When the hydrogen absorption has finished, the solution is filtered, the catalyst washed with 60 parts by volume of warm methanol and the combined methanol solutions are concentrated. The resulting 3 - (2' - diethylaminoethyl) - 4 - phosphoryloxy - indole crystallizes as prisms of M.P. 257°.

Keller's color reaction: blue-violet.

The 3-(2'-diethylaminoethyl)-4-hydroxy-indole is prepared essentially as described for the preparation of 3-(2'-dimethylaminoethyl)-4-hydroxy-indole except that anhydrous diethylamine is used in lieu of anhydrous dimethylamine. The resulting compound crystallizes from ethyl acetate; M.P. 104–106°.

Keller's color reaction: blue-green.
Van Urk's color reaction: violet.

The thereby obtained intermediate compound, 3-(2'-diethylaminoethyl)-4-benzyloxy-indole, crystallizes from ethyl acetate or benzene; M.P. 100–101°.

Keller's color reaction: brown.
Van Urk's color reaction: blue.

EXAMPLE 8

3-(2'-Piperidino-Ethyl)-4-Phosphoryloxy-Indole 1.35 parts of 3-(2'-piperidino-ethyl)-4-hydroxy-indole are dissolved in 30 parts by volume of methanol, the solution is mixed with 5.64 parts by volume of 0.96-normal caustic soda solution and evaporated to dryness in an atmosphere of nitrogen. The residue is dissolved in 30 parts by volume of 1,2-dimethoxy-ethane and a solution of dibenzyl-phosphoryl chloride in 20 parts by volume of carbon tetrachloride, which has been prepared from 1.45 parts of dibenzyl-phosphite, is added. The mixture is then shaken for 10 hours. The precipitated sodium chloride is filtered off, the filtrate evaporated and the residue chromatographed on a thirty-fold amount of aluminum oxide. The resulting 3-(2'-piperidino-ethyl)-4-dibenzyl-phosphoryloxy-indole is eluted from the column with chloroform. It forms an amorphous foam.

A solution of 2 parts of the so-obtained compound in 20 parts by volume of methanol is shaken with 1 part of palladium catalyst and hydrogen until the absorption of hydrogen has finished. Thereupon the mixture is filtered, the precipitate boiled with water and the combined filtrates are evaporated to a small volume. The resulting 3-(2'-piperidino-ethyl)-4-phosphoryloxy-indole thereby crystallizes as colorless prisms of M.P. 260–262°.

Keller's color reaction: violet.
Van Urk's color reaction: brown-orange.

The 3-(2'-piperidino-ethyl)-4-hydroxy-indole used as starting compound herein is prepared as follows:

A solution of 8 parts by volume of oxalyl chloride in 70 parts by volume of ether is added dropwise into a solution of 10 parts by volume of 4-benzyloxy-indole in 100 parts by volume of absolute ether. The solution is shaken for 30 minutes and then 40 parts by volume of piperidine and 50 parts by volume of ether are added while cooling. The reaction mixture is allowed to stand at room temperature for 2 hours and the precipitate is thereafter filtered off and shaken out with water and chloroform. The chloroform solution is evaporated, whereby the pure piperidide of [4-benzyloxy-indolyl-(3)]-glyoxylic acid is obtained. M.P. 132–137°.

7.1 parts of the piperidide of [4-benzyloxy-indolyl-(3)]-glyoxylic acid in 250 parts by volume of boiling absolute dioxane are stirred with 8.7 parts of lithium aluminum hydride in 150 parts by volume of absolute dioxane. Thereupon, the excess of reducing agent is decomposed by treatment with methanol and saturated sodium sulfate solution. The mixture is filtered and the filtrate shaken out with ether and tartaric acid solution. The crude 3-(2'-piperidino-ethyl)-4-benzyloxy-indole is liberated and isolated from the tartaric acid extract as hereinbefore described for 3-(2'-dimethylamino-ethyl)-4-benzyloxy-indole in Example 1. It crystallizes from ethyl acetate; M.P. 126–128°.

3.6 parts of 3-(2'-piperidino-ethyl)-4-benzyloxy-indole are shaken in 110 parts by volume of methanol with 3.4 parts of palladium catalyst on aluminum oxide and with hydrogen. When the hydrogen uptake has finished, the catalyst is filtered off and the filtrate is evaporated to dryness. The resultant 3-(2'-piperidino-ethyl)-4-hydroxy-indole crystallizes from ethyl acetate in massive plates of M.P. 182–183°.

Keller's color reaction: green.

EXAMPLE 9

*1-Methyl-3-(2'-Dimethylaminoethyl)-4-Benzoyloxy-Indole*

0.547 part of sodium is dissolved in 50 parts by volume of tertiary amyl alcohol, after which 4.61 parts of 1-methyl-3-(2'-dimethylaminoethyl)-4-hydroxy-indole are added to the solution in a nitrogen atmosphere, the mixture heated to boiling for a short time and then evaporated to dryness. To the resultant residue 40 parts by volume of 1,2-dimethoxy-ethane are added, followed by a solution of 3.3 parts of benzoylchloride in 40 parts by volume of 1,2-dimethoxy-ethane, the mixture being then stirred for three hours at room temperature. Filtration through talc is then effected, the filtrate evaporated to dryness, and the resultant residue chromatographed with benzene on a column of aluminum oxide. The so-obtained 1-methyl-3-(2'-dimethylaminoethyl)-4-benzoyloxy-indole crystallizes from benzene-petroleum ether in the form of needles which melt at 69.5–71°.

Keller's color reaction: greenish.
Van Urk's color reaction: negative.

EXAMPLE 10

*1-Methyl-3-(2'-Diethylaminoethyl)-4-Benzoyloxy-Indole*

0.5 part of 1-methyl-3-(2'-diethylaminoethyl)-4-hydroxy-indole and 2 parts by volume of dimethyl formamide are added to a suspension of 90.5 parts of sodium hydride in 50 parts by volume of abs. toluene, the mixture being stirred under a nitrogen atmosphere at 60° for 2½ hours. After addition of a solution of 0.53 part of benzoyl chloride in 40 parts by volume of abs. toluene stirring is continued for a further 18 hours at 60° at the end of which surplus sodium hydride is decomposed with methanol. The reaction mixture is twice shaken out with a saturated solution of sodium hydrogen carbonate, dried and boiled down until dry. The residue is dissolved in benzene, washed with benzene and 1% of methanol through a thin bed of alumina and then evaporated. The 1-methyl-3-(2'-diethylaminoethyl)-4-benzoyloxy-indole crystallizes from ethanol in the form of needles of M.P. 167–168°, whereas the corresponding bimaleinate forms lamellae of M.P. 122–124° when crystallized from methanol-ethyl acetate.

Keller's color reaction: negative.
Van Urk's color reaction: negative.

The 1-methyl-3-(2'-diethylaminoethyl)-4-hydroxy-indole used as starting material can be prepared as follows:

8.2 parts of 3-(2'-diethylaminoethyl)-4-benzyloxy-indole are added to a solution of potassium amide—prepared from 2.17 parts of potassium in liquid ammonia—the mixture is stirred for 40 minutes at −60°, and a solution of 8.22 parts of methyl iodide in 75 parts by volume of abs. ether is added thereto dropwise. At the end of 1 hour the ammonia is allowed to evaporate at room temperature, a little methanol is added and the mixture is shaken out between water and chloroform. The chloroform extracts are dried over magnesium sulfate and the residue is distilled in a high vacuum in an air bath. B.P. 195–200°/0.001 mm. Hg.

Keller's color reaction: brownish grey.
Van Urk's color reaction: negative.

6.856 parts of the 1-methyl-3-(2'-diethylaminoethyl)-4-benzyloxy-indole thus obtained are dissolved in 150 parts by volume of methanol and shaken with 2.7 parts of a palladium catalyst on an alumina carrier and hydrogen until no more hydrogen is accepted. The solution is separated from the catalyst by filtration and boiled down. M.P. of the solidified residue 92–95°.

Keller's color reaction: dark grey brown.

Van Urk's color reaction: light green (leaf green).

The following further compounds are obtained by the method described in Example 10 from 1-methyl- or 1-benzyl-3-(2'-dimethylaminoethyl)-4-hydroxy-indole or 1-methyl-3-(2'-piperidino-ethyl)-4-hydroxy-indole:

| Example | Compound | M.P. and crystal form of the bimaleinate | Result of color reaction according to (1) Keller, (2) Van Urk |
|---|---|---|---|
| 11 | 1-methyl-3-(2'-dimethylamino-ethyl)-4-acetoxy-indole. | 140–141° needles from methanol/acetic acid ethyl ester. | (1) brownish. (2) light blue-green. |
| 12 | 1-methyl-3-(2'-dimethylamino-ethyl)-4-trimeth-acetoxy-indole. | 137–138° needles from methanol/acetic acid ethyl ester. | (1) negative, light brown after 1 minute. (2) negative (slightly yellowing). |
| 13 | 1-benzyl-3-(2'-dimethylamino-ethyl)-4-benzo-yloxy-indole. | 127–129° needles from methanol/acetic acid methyl ester. | (1) negative. (2) negative. |
| 14 | 1-methyl-3-(2'-piperidino-ethyl)-4-benzoyloxy-indole. | 168–169° diagonal prisms from methanol/acetic acid ethyl ester. | (1) negative. (2) negative (slightly yellowish). |

The starting material in Example 14, viz. the 1-methyl-3-(2'-piperidino-ethyl)-4-hydroxy-indole is obtained from 3-(2'-piperidino-ethyl)-4-benzyloxy-indole by the same method as employed in Example 10 for the corresponding diethylamino compound. The following novel compounds are thus obtained:

(a) 1-methyl-3-(2'-piperidino-ethyl)-4-benzyloxy-indole, pale yellow viscous oil of B.P. 200°/0.001 mm. Hg in an air bath.

Keller's color reaction: light yellow brown.
Van Urk's color reaction: grey.

(b) 1-methyl-3-(2'-piperidino-ethyl)-4-hydroxy-indole, pale yellow viscous oil of B.P. 155–160°/0.001 mm. Hg in an air bath, M.P. of the solidified distillate 121–126°.

Keller's color reaction: 1 sec. green, then dark grey, later a slightly violet tinge.
Van Urk's color reaction: light green.

EXAMPLE 15

*1-Allyl-3-(2'-Dimethylaminoethyl)-4-Trimethylacetoxy-Indole*

A solution of 1.67 parts of 3-(2'-dimethylaminoethyl)-4-trimethyl-acetoxy-indole in 50 parts by volume of abs. ether is mixed with a solution of potassium amide—prepared from 0.315 part of potassium in liquid ammonia, the mixture being stirred for 30 minutes at −60°. 0.770 part of allyl bromide are then added, and at the end of a further 15 minutes the ammonia is allowed to evaporate. A little methanol is added, the mixture shaken out between water and ether, the ethereal solution is dried over magnesium sulfate, the ether evaporated and the residue chromatographed on alumina with benzene.

The 1-allyl-3-(2'-dimethylaminoethyl)-4-trimethyl-acetoxy-indole-bimaleinate crystallizes from acetic acid ethyl ester in the form of lamellae of M.P. 124–126°.

Keller's color reaction: negative (slightly yellowing).
Van Urk's color reaction: negative (slightly yellowing).

The 3-(2'-dimethylaminoethyl)-4-trimethyl-acetoxy-indole used as starting material can be prepared as follows:

0.345 part of sodium are dissolved in 30 parts by volume of abs. ethanol, 2.81 parts of 3-(2'-dimethylaminoethyl)-4-hydroxy-indole are added under a nitrogen atmosphere, and the whole is evaporated until dry. 40 parts by volume of 1,2-dimethoxy ethane are added to the dry residue, a solution of 1.69 parts of trimethyl-acetyl-chloride (pivalic acid chloride) in 20 parts by volume of 1,2-dimethoxy ethane is added and the mixture stirred for 3 hours at room temperature. The reaction mixture is filtered through talc, the filtrate is evaporated until dry, and the residue chromatographed with chloroform on an alumina column. 3-(2'-dimethylaminoethyl)-4-trimethylacetoxy-indole crystallizes from benzene/petroleum ether in the form of husks and druses of M.P. 123–124°.

Keller's color reaction: green.

Van Urk's color reaction: light blue.

We claim:

1. A compound of the formula

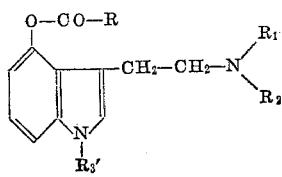

wherein each of $R_1$ and $R_2$ represents a lower alkyl group and $R_1$ and $R_2$ taken together with the adjacent nitrogen atom represent a residue selected from the group consisting of pyrrolidino and piperidino, $R_3'$ is a member selected from the class consisting of lower alkyl, lower alkenyl and phenyl-lower alkyl, and R is a member selected from the group consisting of lower alkyl and phenyl.

2. A compound of the formula

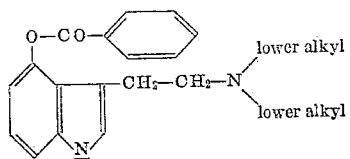

3. A compound of the formula

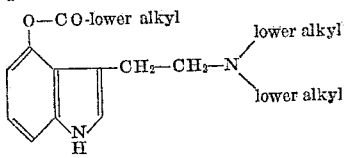

4. A compound of the formula

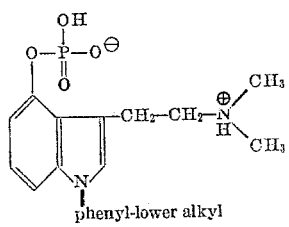

5. 1 - benzyl - 3 - (2' - dimethylaminoethyl) - 4 - phosphoryloxy-indole.

6. 3-(2'-dimethylaminoethyl)-4-benzoyloxy-indole.

7. 3 - (2' - dimethylaminoethyl) - 4 - trimethylocetoxy-indole.

8. 1 - methyl - 3 - (2' - dimethylaminoethyl) - 4 - benzoyloxy-indole.

9. 1 - methyl - 3 - (2' - dimethylaminoethyl) - 4 - trimethylacetoxy-indole.

10. 1 - allyl - 3 - (2' - dimethylaminoethyl) - 4 - trimethylacetoxy-indole.

11. 1 - benzyl - 3 - (2' - dimethylaminoethyl) - 4 - benzoyloxy-indole.

References Cited in the file of this patent

UNITED STATES PATENTS 2,814,625    Speeter _____ Nov. 26, 1957

OTHER REFERENCES

Hofmann et al.: Experientia, vol. 14, pages 397–399 (1958).

Hofmann et al.: Experientia, vol. 14, pages 107–109 (March 15, 1958).

Troxler: Helva. Chim. Acta., vol. 42, pp. 2073–2103 (1959).